United States Patent
Jeong et al.

(10) Patent No.: US 10,751,838 B2
(45) Date of Patent: Aug. 25, 2020

(54) LASER CUTTING APPARATUS AND LASER CUTTING METHOD USING THE SAME

(71) Applicant: Samsung Display Co., Ltd., Yongin-si, Gyeonggi-do (KR)

(72) Inventors: Ilyoung Jeong, Yongin-si (KR); Gyoowan Han, Yongin-si (KR); Jaeil Kim, Yongin-si (KR); Kuhyun Kang, Yongin-si (KR); Soobum Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 321 days.

(21) Appl. No.: 15/814,231

(22) Filed: Nov. 15, 2017

(65) Prior Publication Data

US 2018/0133842 A1    May 17, 2018

(30) Foreign Application Priority Data

Nov. 16, 2016   (KR) .......................... 10-2016-0152971

(51) Int. Cl.
| | |
|---|---|
| *B23K 26/38* | (2014.01) |
| *B23K 26/082* | (2014.01) |
| *B23K 26/03* | (2006.01) |
| *B23K 26/08* | (2014.01) |
| *B23K 26/402* | (2014.01) |
| *C03B 33/04* | (2006.01) |
| *C03B 33/09* | (2006.01) |
| *B23K 26/0622* | (2014.01) |

(Continued)

(52) U.S. Cl.
CPC ............. *B23K 26/38* (2013.01); *B23K 26/03* (2013.01); *B23K 26/04* (2013.01); *B23K 26/0622* (2015.10); *B23K 26/082* (2015.10); *B23K 26/0853* (2013.01); *B23K 26/0876* (2013.01); *B23K 26/402* (2013.01); *C03B 33/04* (2013.01); *C03B 33/091* (2013.01); *B23K 2103/54* (2018.08)

(58) Field of Classification Search
CPC .. B23K 26/38; B23K 26/0622; B23K 26/082; B23K 26/0853; B23K 26/0876
USPC ........................................ 219/121.68, 121.69
See application file for complete search history.

(56) References Cited

U.S. PATENT DOCUMENTS

| | | |
|---|---|---|
| 8,507,157 B2 | 8/2013 | Lee |
| 9,174,307 B2 | 11/2015 | Lee et al. |
| 9,434,024 B2 | 9/2016 | Numata et al. |

(Continued)

FOREIGN PATENT DOCUMENTS

| | | |
|---|---|---|
| KR | 10-2010-0107252 A | 10/2010 |
| KR | 10-2011-0024553 A | 3/2011 |

(Continued)

*Primary Examiner* — Jennifer C Chiang
(74) *Attorney, Agent, or Firm* — Lewis Roca Rothgerber Christie LLP (57) ABSTRACT

A laser cutting apparatus and a laser cutting method are provided. A laser cutting method includes: preparing an object on a stage; cutting the object into a set shape by relatively moving and irradiating a laser beam along the set shape with respect to the object; and performing uniform heating compensation to reduce accumulation of thermal energy of the laser beam resulting from a change of speed at a shift point where a travelling direction of the laser beam with respect to the object changes.

18 Claims, 6 Drawing Sheets

(51) Int. Cl.
*B23K 26/04* (2014.01)
*B23K 103/00* (2006.01)

(56) References Cited

U.S. PATENT DOCUMENTS

| | | | |
|---|---|---|---|
| 10,144,668 B2 * | 12/2018 | Altman | C03B 33/04 |
| 2010/0243628 A1 | 9/2010 | Lee et al. | |

FOREIGN PATENT DOCUMENTS

| KR | 10-2012-0020942 A | 3/2012 |
|---|---|---|
| KR | 10-2013-0119173 A | 10/2013 |
| KR | 10-2014-0067151 A | 6/2014 |
| KR | 10-2015-0033994 A | 4/2015 |
| KR | 10-2016-0075243 A | 6/2016 |
| WO | WO 2015/046738 A1 | 4/2015 |
| WO | WO-2015046738 A1 * | 4/2015 |

* cited by examiner

LASER CUTTING APPARATUS AND LASER CUTTING METHOD USING THE SAME

CROSS-REFERENCE TO RELATED APPLICATION

This application claims priority to and the benefit of Korean Patent Application No. 10-2016-0152971, filed on Nov. 16, 2016 in the Korean Intellectual Property Office, the entire disclosure of which is incorporated herein by reference.

BACKGROUND

1. Field

Aspects of one or more embodiments relate to a laser cutting apparatus for cutting an object such as a glass substrate by using a laser beam, and a cutting method using the laser cutting apparatus.

2. Description of the Related Art

In general, a laser cutting apparatus may be used to cut, for example, a display apparatus, which has a glass substrate as a base substrate, into a desired size. Examples of the display apparatus may include an organic light-emitting display (OLED) apparatus, a liquid crystal display (LCD) apparatus, and the like. When such a display apparatus is manufactured, a process of irradiating a laser beam onto a substrate of the product to cut the substrate into a desired size and shape is performed. As the laser beam moves along a shape of the substrate, unless the substrate has a linear shape, there is inevitably a portion where a cutting direction changes, and the portion involves a section where a movement speed of the laser beam changes, i.e. an acceleration/deceleration section. A movement speed of the laser beam decreases compared to a constant velocity movement section, and, thus, an irradiation amount of the laser beam relatively increases. Accordingly, product quality may be degraded due to an overheating phenomenon.

SUMMARY

According to an aspect of one or more embodiments, a laser cutting apparatus has an improved cutting process regarding an acceleration/deceleration section of laser beam movement, and a laser cutting method using the laser cutting apparatus is provided.

According to another aspect of one or more embodiments, an improved laser beam apparatus whereby uniform thermal energy may be applied in an acceleration/deceleration section as well as another section, and a cutting method using the laser beam apparatus, are provided.

Additional aspects will be set forth, in part, in the description which follows and, in part, will be apparent from the description, or may be learned by practice of the presented embodiments.

According to one or more embodiments, a laser cutting method includes: preparing an object on a stage; cutting the object into a set shape by relatively moving and irradiating a laser beam along the set shape with respect to the object; and performing uniform heating compensation reduce or prevent excessive accumulation of thermal energy of the laser beam resulting from a change of speed at a shift point where a travelling direction of the laser beam with respect to the object changes.

The set shape may include a first section and a second section connected to each other with the shift point therebetween, and the performing of the uniform heating compensation may include: cutting up to the shift point by moving and irradiating the laser beam along the first section at a constant velocity with respect to the object; overrun decelerating for allowing the laser beam to overrun the set shape while maintaining, even after the shift point, the travelling direction and the constant velocity maintained when cutting the first section, and then decelerating the laser beam; overrun direction shifting for changing the direction at the outside of the set shape; and overrun accelerating for accelerating the laser beam at the outside of the set shape such that the laser beam travels at the constant velocity with respect to the object, and then allowing the laser beam to enter the second section through the shift point.

The overrun decelerating, the overrun direction shifting, and the overrun accelerating may include stopping the irradiating the laser beam.

The overrun decelerating may include stopping the irradiating the laser beam at a moment when the laser beam moves beyond the first section, and the overrun accelerating may include starting irradiating the laser beam at a moment when the laser beam enters the second section.

The first section and the second section may include linear sections perpendicular to each other.

The set shape may include a first section and a second section connected to each other with the shift point therebetween, and the performing of the uniform heating compensation may include: performing cutting by moving and irradiating the laser beam along the first section at a constant velocity with respect to the object; tracking a movement speed and a location of the laser beam relative to the object; while changing a travelling speed of the laser beam at the shift point, changing the direction to a direction toward the second section, and increasing, in response to the change of speed, an interval between irradiation pulses of the laser beam to control a laser irradiation amount so as to be maintained the same per unit distance; and allowing the laser beam to travel at the constant velocity with respect to the object and enter the second section.

The first section and the second section may include linear sections perpendicular to each other.

The set shape may include a first section and a second section connected to each other with the shift point therebetween, and the performing of the uniform heating compensation may include: performing cutting by moving and irradiating the laser beam along the first section at a constant velocity with respect to the object; while changing a travelling speed of the laser beam at the shift point, changing the direction to a direction toward the second section and decreasing beam intensity of the laser beam; and allowing the laser beam to travel at the constant velocity with respect to the object and enter the second section.

At the shift point, the beam intensity of the laser beam may be decreased to 80 to 90% of that corresponding to the first section and the second section.

The first section and the second section may include linear sections perpendicular to each other.

The laser beam may include a swing laser beam which is irradiated while moving back and forth.

The object may include a glass substrate having a polarization layer on a surface thereof.

According to one or more embodiments, a laser cutting apparatus includes: a stage on which an object is to be placed; a laser unit configured to cut the object into a set shape by relatively moving and irradiating a laser beam along the set shape with respect to the object; and a controller to perform uniform heating compensation and reduce or prevent excessive accumulation of thermal energy of the laser beam resulting from a change of speed at a shift point where a travelling direction of the laser beam with respect to the object changes.

The set shape may include a first section and a second section connected to each other with the shift point therebetween, and the controller may include: a tracking unit configured to track a movement speed and a location of the laser beam relative to the object; and an instruction unit configured to move and irradiate the laser beam along the first section at a constant velocity; allow the laser beam to overrun the set shape while maintaining, even after the shift point, the travelling direction and the constant velocity maintained when cutting the first section, and then decelerate the laser beam; change the travelling direction at the outside of the set shape so as to allow the laser beam to enter the second section; and then accelerate the laser beam at the outside of the set shape such that the laser beam travels at the constant velocity, and then allow the laser beam to enter the second section through the shift point.

The controller may include: a tracking unit configured to track a movement speed and a location of the laser beam relative to the object; and an instruction unit configured to increase, in response to the change of speed of the laser beam at the shift point, an interval between irradiation pulses of the laser beam and thus control a laser irradiation amount so as to be identical per unit distance.

The controller may include: a tracking unit configured to track a movement speed and a location of the laser beam relative to the object; and an instruction unit configured to decrease beam intensity of the laser beam while changing a travelling speed of the laser beam at the shift point.

The laser beam may include a swing laser beam which is irradiated while moving back and forth.

The object may include a glass substrate having a polarization layer on a surface thereof.

BRIEF DESCRIPTION OF THE DRAWINGS

These and/or other aspects will become apparent and more readily appreciated from the following description of some embodiments, taken in conjunction with the accompanying drawings in which.

DETAILED DESCRIPTION

While the present disclosure allows for variations and numerous embodiments, certain embodiments will be illustrated in the drawings and described in further detail in the following description. Effects and features of the present disclosure and methods of accomplishing the same may be understood more readily by reference to the following description of some embodiments and the accompanying drawings. The present disclosure may, however, be embodied in many different forms and should not be construed as being limited to the embodiments set forth herein.

Herein, some embodiments will be described in further detail with reference to the accompanying drawings. Like reference numerals in the drawings denote like elements, and thus a repeated description thereof will be omitted.

The singular forms "a," "an," and "the" used herein are intended to include the plural forms as well, unless the context clearly indicates otherwise.

It will be understood that terms such as "include," "comprise," and "have" used herein specify the presence of stated features or components, but do not preclude the presence or addition of one or more other features or components.

Sizes of components or layers in the drawings may be exaggerated or reduced for convenience of explanation. However, since sizes and thicknesses of components or layers in the drawings may be arbitrarily illustrated for convenience of explanation, the present disclosure is not limited thereto.

When an embodiment may be implemented differently, a specific process order may be performed differently from the described order. For example, two consecutively described processes may be performed substantially at the same time or performed in an order opposite to the described order.

Figure 1:
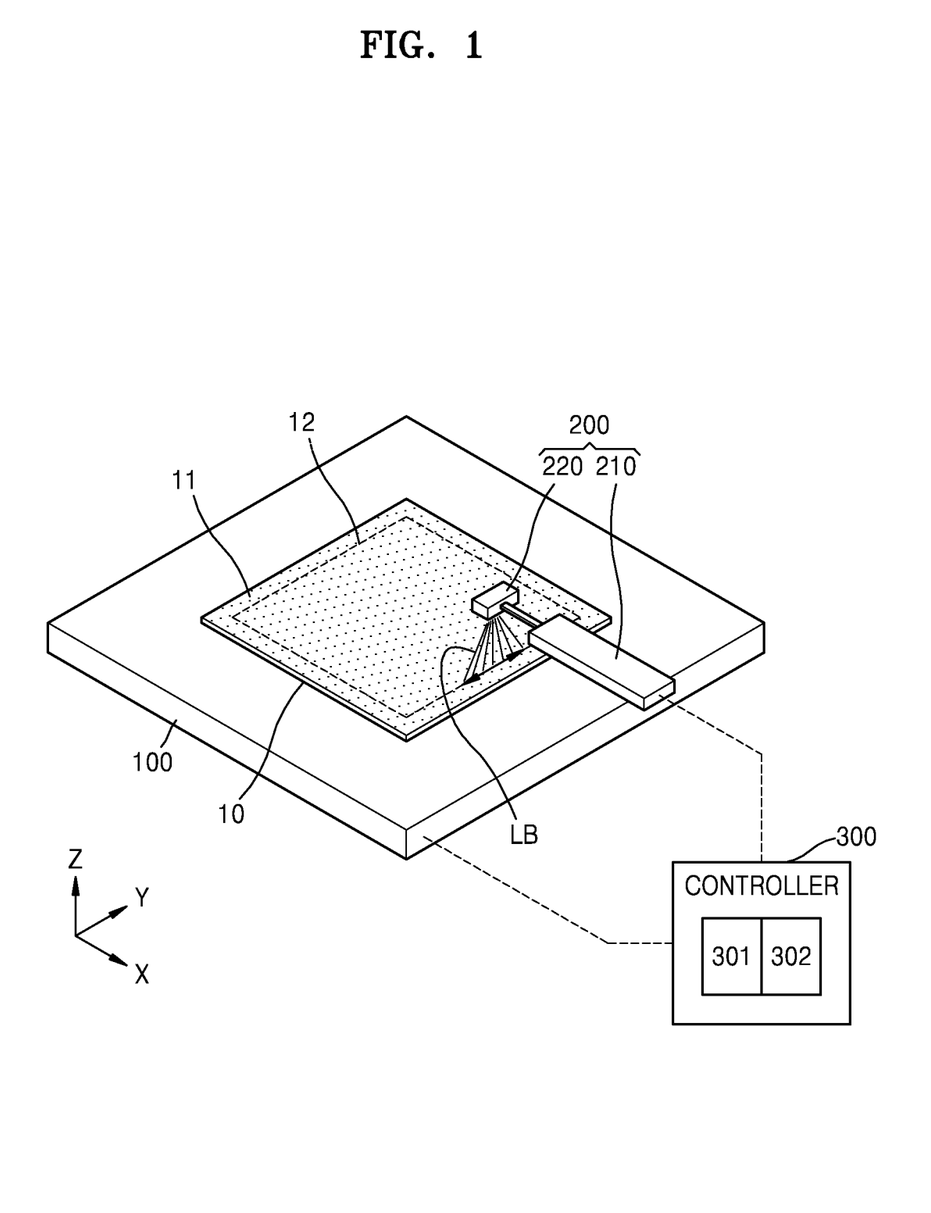
FIG. 1 is a perspective view of a laser cutting apparatus according to an embodiment.
Figure 2:
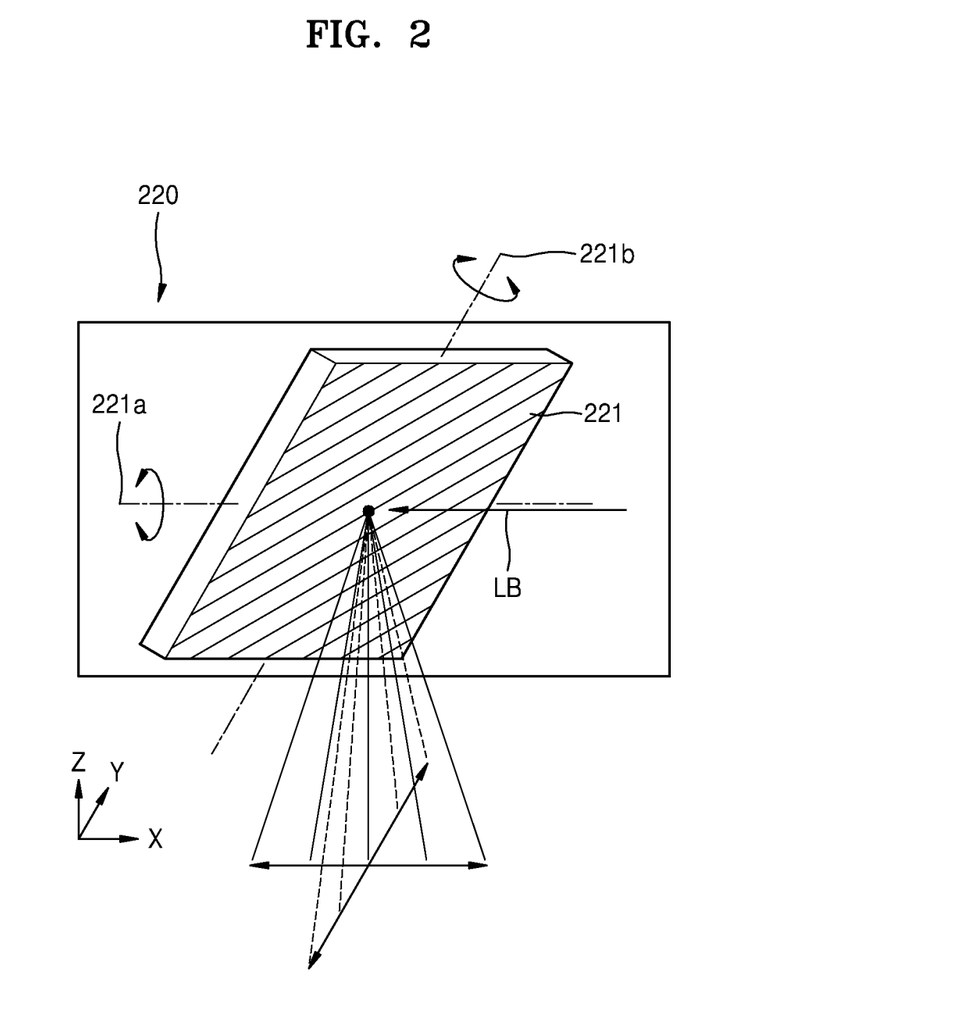
FIG. 2 is a schematic perspective view of a laser swing device included in a laser unit of the laser cutting apparatus of FIG. 1.

FIG. 1 is a perspective view of a laser cutting apparatus according to an embodiment; and FIG. 2 is a schematic perspective view of a laser swing device 220 included in a laser unit 200 of the laser cutting apparatus of FIG. 1.

Generally, in a display apparatus, such as an organic light-emitting display (OLED) apparatus or a liquid crystal display (LCD) apparatus, a glass substrate 10 may be used as a base substrate, and the base substrate needs to be cut into a desired cell unit.

The laser cutting apparatus and a laser cutting method which will be described later may be used to cut the glass substrate 10 of the display apparatus to have a cell shape. Reference numeral 11 denotes a polarization layer on a surface of the glass substrate 10, and the glass substrate 10 having a polarization layer 11 on a surface thereof will be described as an example of a cutting object.

As illustrated in FIG. 1, the laser cutting apparatus includes a stage 100 on which the glass substrate 10, which is an object, is placed, the laser unit 200 to perform cutting according to a set shape 12 by irradiating a laser beam LB onto the glass substrate 10, and a controller 300 to control operations of the stage 100 and the laser unit 200.

In an embodiment, the stage 100 may move on a plane (e.g., an X-Y plane). That is, in order to perform a cutting operation by irradiating a laser beam according to the set shape 12, there should be relative movement involving movement of the glass substrate 10 or the laser unit 200. In the present embodiment, the glass substrate 10 is moved as the stage 100 is moved. In some embodiments, the stage 100 may be fixed and the laser unit 200 may be moved.

In an embodiment, the laser unit 200 includes a laser generator 210 to generate a laser beam, and the laser swing device 220 allowing the generated laser beam to move back and forth.

The laser beam generated by the laser generator 210 may be any of a variety of types, such as a $CO_2$ laser, a green laser, an infrared laser, an ultraviolet laser, etc.

In the laser swing device 220, as illustrated in FIG. 2, a reflection mirror 221 may swing about a first axis 221a (e.g., an X-axis direction) and allow a laser beam LB to move back and forth within a certain distance, and may swing about a second axis 221b (e.g., a Y-axis direction) and allow the laser beam LB to move back and forth in a direction perpendicular thereto. As described above, when the laser beam LB is irradiated in the form of a swing beam, the laser beam LB may be more densely and uniformly irradiated onto the object. That is, when the laser beam LB is irradiated in the form of a swing beam, although the laser beam LB is not irradiated only onto the same place because the glass substrate 10 moves, laser irradiation may proceed while overlapping several times in the same section, and thus, more dense irradiation may be achieved. In an embodiment, since the laser beam LB is not continuously output while irradiated onto the object (e.g., the substrate), but is irradiated in the form of a pulse (refer to FIG. 4) by a very small space, the form of a swing beam may properly fill the space and thus may be effective in increasing efficiency of cutting using a laser beam.

The controller 300 includes a tracking unit 301 to track a location and a movement speed of the laser beam LB relative to the glass substrate 10, and an instruction unit 302 to command irradiation of the laser beam LB and movement of the glass substrate 10, that is, movement of the stage 100, based on the location and the movement speed. Accordingly, the instruction unit 302 gives control orders regarding the stage 100 and the laser unit 200 by referring to information of the tracking unit 301 and performs a cutting operation.

However, there could be a problem, when the glass substrate 10 is cut along the set shape 12, if deceleration and acceleration were to essentially occur at a shift point 12c (refer to FIG. 3) where a travelling direction of the laser beam LB is changed. That is, when the glass substrate 10 is cut along the set shape 12 to have a rectangular shape as shown in FIG. 1, a process of deceleration, shift of direction, and acceleration may be performed to move from one straight line to the next straight line perpendicularly connected thereto. Accordingly, in a speed change section where such deceleration and acceleration occur, the laser beam LB may remain for a longer duration compared to a constant velocity movement section, and, thus, a laser irradiation amount would relatively increase. As a result, product quality could be degraded due to an overheating phenomenon.

However, according to laser cutting methods of embodiments of the present invention which will be described below, there is provided a uniform heating compensation method capable of effectively preventing overheating at a shift point 12c (refer to FIG. 3) where a change of direction occurs.

Figure 3:
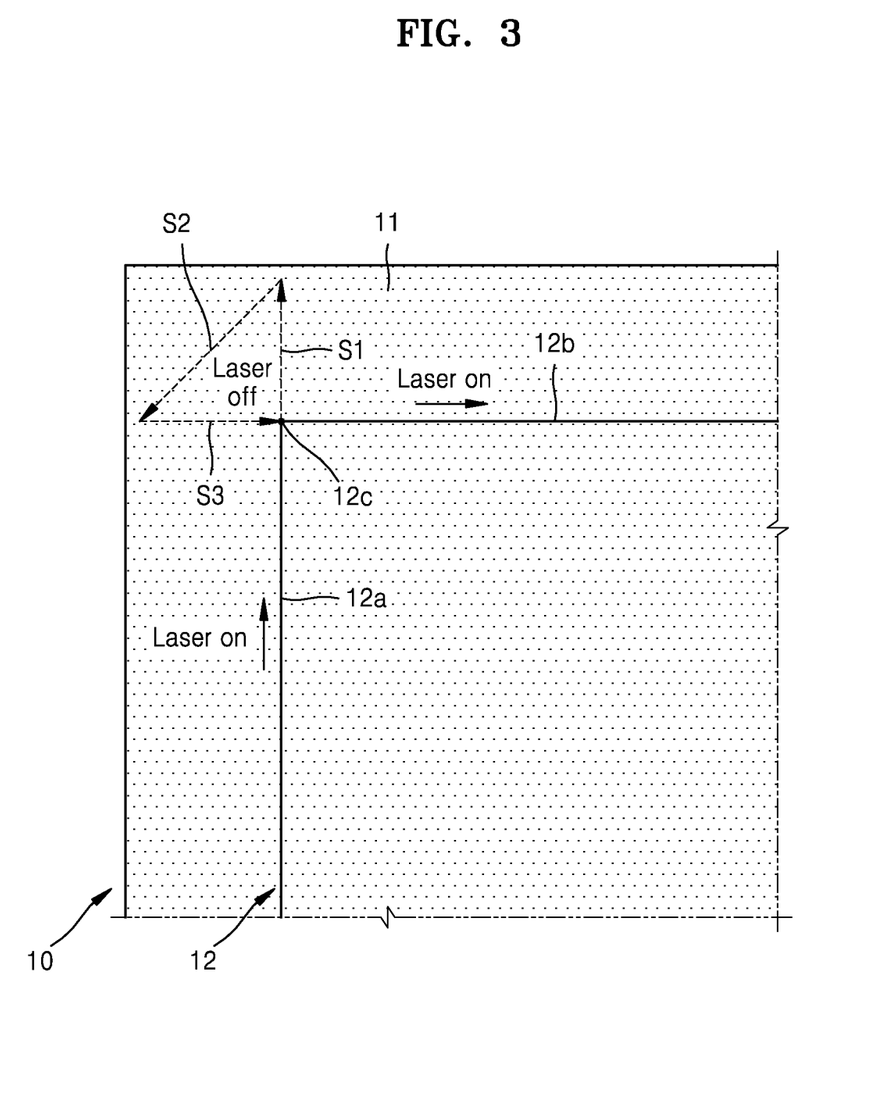
FIG. 3 is a schematic plan view illustrating a laser cutting method according to an embodiment.

FIG. 3 illustrates a laser cutting method according to an embodiment.

FIG. 3 illustrates a case in which, when the glass substrate 10 is cut into the set shape 12, a 90-degree shift is made from a first section 12a to a second section 12b. In an embodiment, the first section 12a and the second section 12b are linear sections perpendicularly connected to each other, and the shift point 12c, which is a connecting portion therebetween, is a vertex. Accordingly, the laser beam LB has to perform cutting while travelling along the first section 12a and shift in direction by 90 degrees to the second section 12b perpendicular to the first section 12a and travel therealong.

If the laser beam LB were to decelerate near the shift point 12c, shift in direction by 90 degrees, and accelerate again, a period during which the laser beam LB remains at that position or region would relatively increase as described above, and, thus, a problem could arise. In order to avoid this, in the present embodiment, laser cutting is performed as described below.

First, when the first section 12a is cut, the laser beam LB performs cutting while following a shape of the first section 12a at a constant velocity. In an embodiment, the first section 12a is a linear section, and irradiating the laser beam LB in the form of a swing beam and allowing the laser beam LB to travel at a constant velocity leads to cutting involving uniform and dense irradiation.

Then, when the laser beam LB reaches the shift point 12c, the laser beam LB passes the shift point 12c while maintaining the constant velocity at which the laser beam LB has been travelling along the first section 12a, and, thus, proceeds to overrun the set shape 12 (S1). That is, instead of being decelerated before the shift point 12c, the laser beam LB is allowed to pass the shift point 12c while maintaining the speed at which the laser beam LB has been travelling along the first section 12a, and then, is decelerated outside the set shape 12. As a result, no speed change section is generated while the glass substrate 10 is cut into the set shape 12, and, thus, no problem occurs due to overheating. In an embodiment, starting from the moment when the laser beam LB moves beyond the set shape 12 at the shift point 12c, the laser generator 210 is turned off to stop irradiating the laser beam LB onto the glass substrate 10.

Next, a travelling direction of the laser beam LB is changed outside the set shape 12 in order to enter the second section 12b (S2).

Then, the laser beam LB is accelerated toward the second section 12b and reaches the speed at which the laser beam LB was travelling along the first section 12a when the laser beam LB reaches the shift point 12c (S3).

Next, the laser beam LB enters the second section 12b and the laser generator 210 is turned on again at the moment when the laser beam LB passes the shift point 12c and starts irradiation of the laser beam LB, and the laser beam LB goes on to cut the second section 12b while maintaining the speed at a constant velocity.

As described above, since the laser beam LB is allowed to overrun the set shape 12, and then enter the set shape 12 again after deceleration, shift of direction and acceleration at an area outside the set shape 12, no speed change section, such as an acceleration/deceleration section, is generated while the glass substrate 10 is cut into the set shape 12.

Accordingly, uniform laser irradiation over the entire cutting area including the shift point 12c may be performed, and, thus, product degradation due to an overheating phenomenon of a certain part may be avoided.

Figure 4:
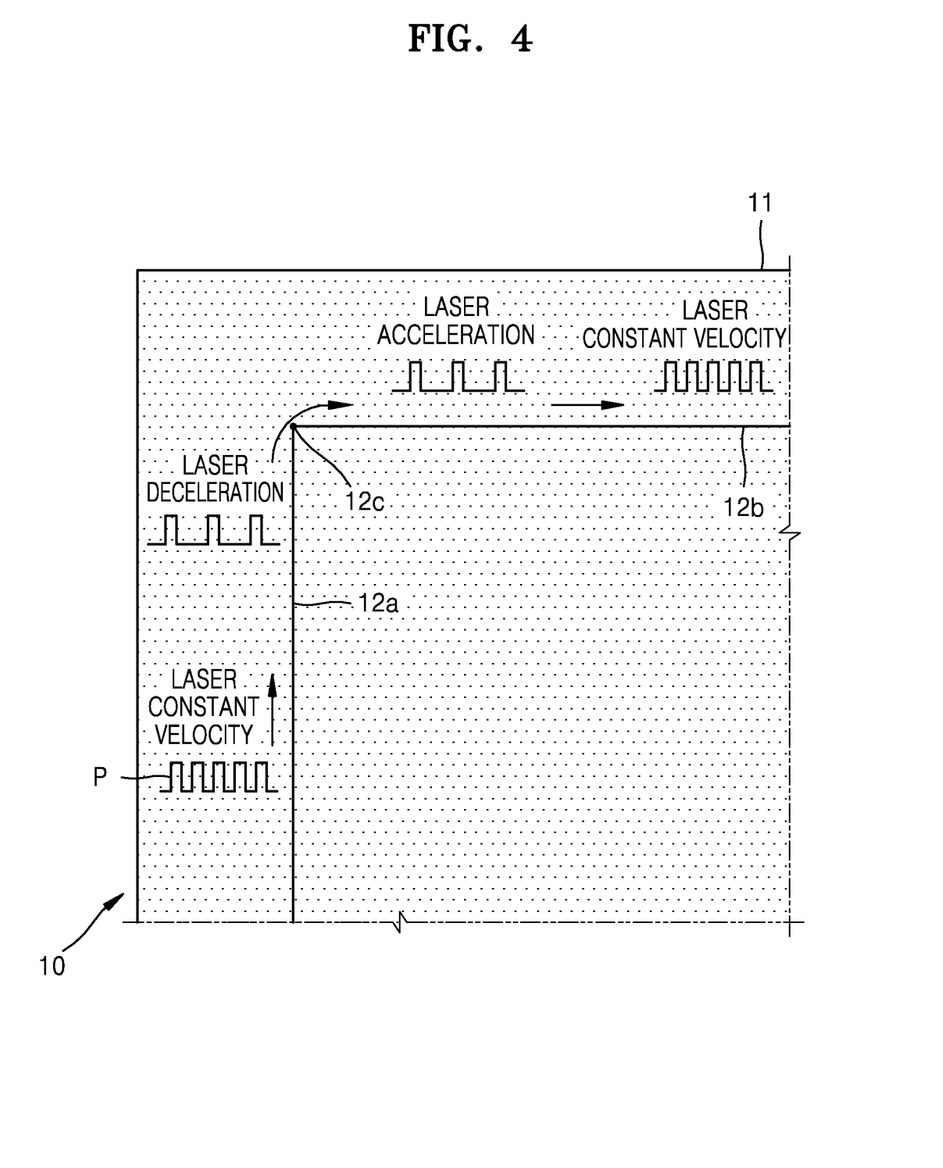
FIG. 4 is a schematic plan view illustrating a laser cutting method according to another embodiment.

FIG. 4 illustrates a laser cutting method according to another embodiment, in which a uniform heating compensation method for adjusting an interval between irradiation pulses P of the laser beam LB is provided.

FIG. 4 also illustrates the case in which, when the glass substrate 10 is cut into the set shape 12, a 90-degree shift is made from the first section 12a to the second section 12b. Accordingly, the laser beam LB has to perform cutting while travelling along the first section 12a and shift in direction by 90 degrees to the second section 12b perpendicular to the first section 12a and travel therealong.

First, when the first section 12a is cut, the laser beam LB performs cutting while following a shape of the first section 12a at a constant velocity. In an embodiment, the first section 12a is a linear section, and irradiating the laser beam LB in the form of a swing beam and allowing the laser beam LB to travel at a constant velocity leads to cutting involving uniform and dense irradiation. During the cutting operation, the tracking unit 301 of the controller 300 continues to track a location and a movement speed of the laser beam LB, and an interval between irradiation pulses P of the laser beam LB is also constantly maintained along with the movement speed.

Then, when the laser beam LB approaches the shift point 12c, the laser beam LB is decelerated by reducing the movement speed of the laser beam LB, and, at the shift point 12c, a direction of the laser beam LB is shifted by 90 degrees, and the laser beam LB is accelerated to reach the constant velocity again. At the same time, the instruction unit 302 of the controller 300 senses a speed change section by taking into account the location and the movement speed of the laser beam LB being tracked by the tracking unit 301 and increases the interval between the irradiation pulses P of the laser beam LB during the deceleration and acceleration sections.

That is, as a travelling speed of the laser beam LB is changed near the shift point 12c, a direction of the laser beam LB is shifted, and, in response to the change of speed, an interval between irradiation pulses P of the laser beam LB is increased to control a laser irradiation amount so as to remain the same per unit distance.

Next, the laser beam LB is allowed to enter the second section 12b, and goes on to cut the second section 12b while restoring the shorter interval between the irradiation pulses P of the laser beam LB and also restoring and maintaining the speed at a constant velocity.

As described above, by increasing an interval between irradiation pulses P of the laser beam LB in a speed change section of deceleration, shift of direction, and acceleration to control a laser irradiation amount so as to remain the same per unit distance, uniform laser irradiation over the entire cutting area including the shift point 12c may be performed, and accordingly, product degradation due to an overheating phenomenon of a certain part may be avoided.

Figure 5:
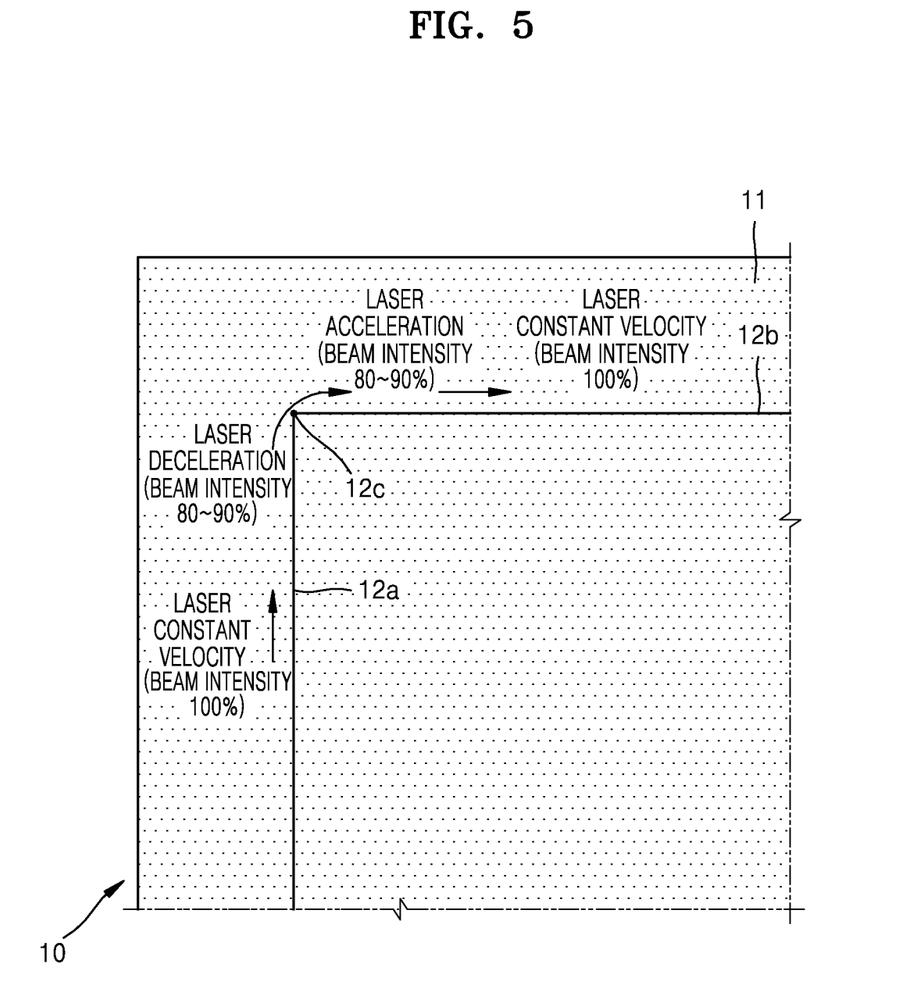
FIG. 5 is a schematic plan view illustrating a laser cutting method according to another embodiment.

FIG. 5 illustrates a laser cutting method according to another embodiment, in which a uniform heating compensation method for adjusting beam intensity of the laser beam LB is provided.

FIG. 5 also illustrates the case in which, when the glass substrate 10 is cut into the set shape 12, a 90-degree shift is made from the first section 12a to the second section 12b, and the laser beam LB has to perform cutting while travelling the first section 12a and shift in direction by 90 degrees to the second section 12b perpendicular to the first section 12a and travel therealong.

First, when the first section 12a is cut, the laser beam LB performs cutting while following a shape of the first section 12a at a constant velocity. In an embodiment, the first section 12a is a linear section, and irradiating the laser beam LB in the form of a swing beam and allowing the laser beam LB to travel at a constant velocity leads to cutting involving uniform and dense irradiation. During the cutting operation, the tracking unit 301 of the controller 300 continues to track a location and a movement speed of the laser beam LB, and the laser beam LB maintains 100% of beam intensity set for the cutting operation.

Then, when the laser beam LB approaches the shift point 12c, the laser beam LB is decelerated by reducing the movement speed of the laser beam LB, and, at the shift point 12c, a direction of the laser beam LB is shifted by 90 degrees, and the laser beam LB is accelerated to reach the constant velocity again. At the same time, the instruction unit 302 of the controller 300 senses a speed change section by taking into account the location and the movement speed of the laser beam LB being tracked by the tracking unit 301 and decreases beam intensity of the laser beam LB during the deceleration and acceleration sections to 80~90% of the beam intensity corresponding to the first section 12a, which is a constant velocity section.

That is, as a travelling speed of the laser beam LB is changed near the shift point 12c, a direction of the laser beam LB is shifted, and, in response to the change of speed, beam intensity of the laser beam LB is decreased to control a laser irradiation amount so as to remain the same per unit distance.

Next, the laser beam LB is allowed to enter the second section 12b, and goes on to cut the second section 12b while restoring the beam intensity corresponding to the first section 12a and also restoring and maintaining the speed at a constant velocity.

As described above, by decreasing beam intensity of the laser beam LB in a speed change section of deceleration, shift of direction, and acceleration to control a laser irradiation amount so as to be identical per unit distance, uniform laser irradiation over the entire cutting area including the shift point 12c may be performed, and accordingly, product degradation due to an overheating phenomenon of a certain part may be solved.

Figure 6:
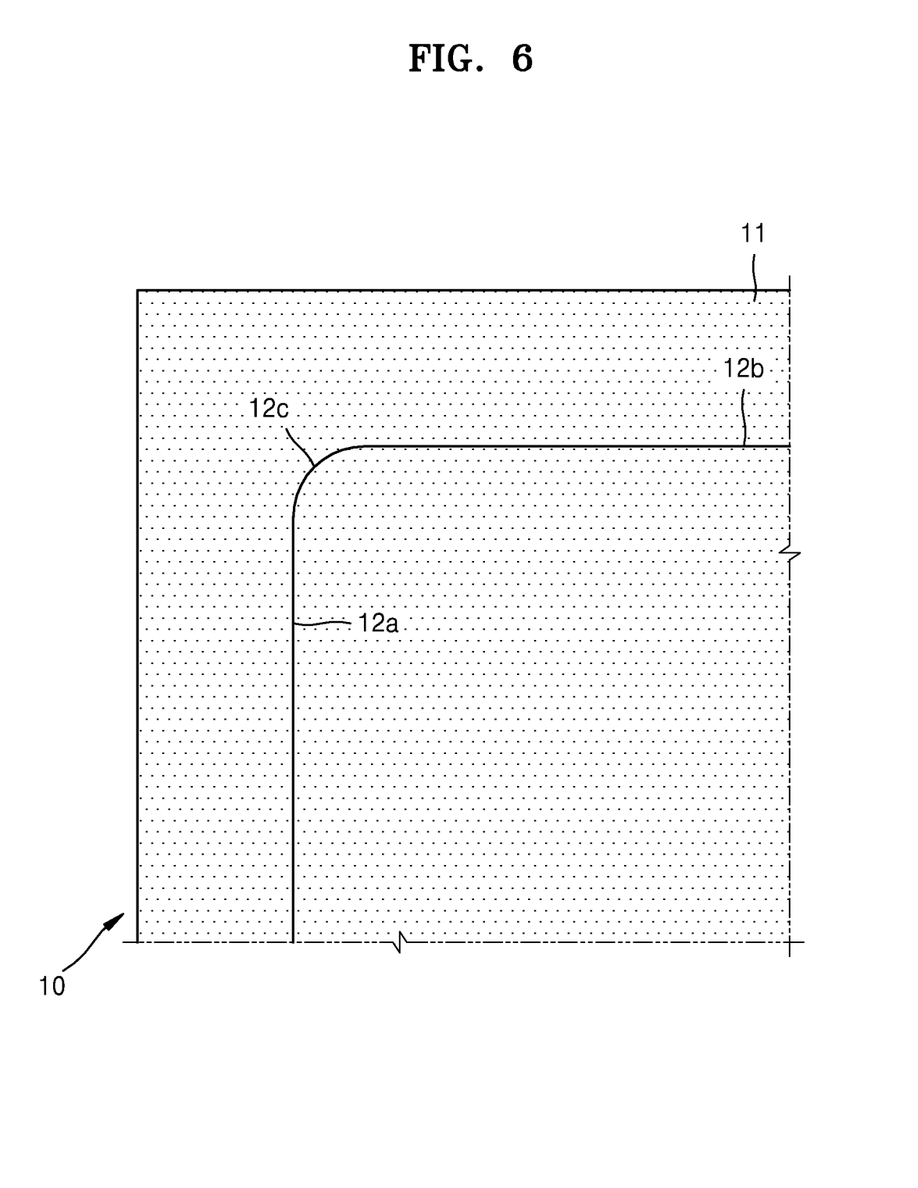
FIG. 6 is a schematic plan view of a modified shape of a cutting object which may be obtained by using the laser cutting apparatus illustrated in FIG. 1.

In the embodiments described above, a case in which the shift point 12c of the set shape 12 has a vertex shape is illustrated. However, this is described only as an example, and various modifications may be made. For example, the cutting method in which an interval between irradiation pulses of a laser beam is increased or beam intensity of the laser beam is decreased at the shift point 12c may be applied the same to a case in which the shift point 12c has a curved shape as shown in FIG. 6.

According to the laser cutting apparatus and the substrate cutting method using the same described herein, cutting may be performed by uniformly applying thermal energy to the entire area of an object including an acceleration/deceleration section, and, thus, product degradation due to overheating of a certain section may be avoided. Accordingly, defects of a product may decrease, and quality of the product may improve.

It is to be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A laser cutting method comprising:
    preparing an object on a stage;
    cutting the object into a set shape by relatively moving and irradiating a laser beam along the set shape with respect to the object and changing a speed of the laser beam with respect to the object about a shift point where a travelling direction of the laser beam with respect to the object changes; and
    performing uniform heating compensation to reduce accumulation of thermal energy of the laser beam in response to the change of speed at the shift point.

2. The laser cutting method of claim 1, wherein the set shape comprises a first section and a second section connected to each other with the shift point therebetween, and the performing the uniform heating compensation comprises:
performing cutting by moving and irradiating the laser beam along the first section at a constant velocity with respect to the object;
tracking a movement speed and a location of the laser beam relative to the object;
while changing a travelling speed of the laser beam at the shift point with respect to the object, changing the travelling direction to a direction toward the second section, and increasing, in response to the change of travelling speed, an interval between irradiation pulses of the laser beam to control a laser irradiation amount so as to be maintained the same per unit distance; and
allowing the laser beam to travel at the constant velocity with respect to the object and enter the second section.

3. The laser cutting method of claim 2, wherein the first section and the second section comprise linear sections perpendicular to each other.

4. The laser cutting method of claim 1, wherein the set shape comprises a first section and a second section connected to each other with the shift point therebetween, and
the performing the uniform heating compensation comprises:
performing cutting by moving and irradiating the laser beam along the first section at a constant velocity with respect to the object;
while changing a travelling speed of the laser beam with respect to the object at the shift point, changing the travelling direction to a direction toward the second section and decreasing a beam intensity of the laser beam; and
allowing the laser beam to travel at the constant velocity with respect to the object and enter the second section.

5. The laser cutting method of claim 4, wherein, at the shift point, the beam intensity of the laser beam is decreased to 80 to 90% of that corresponding to the first section and the second section.

6. The laser cutting method of claim 4, wherein the first section and the second section comprise linear sections perpendicular to each other.

7. The laser cutting method of claim 1, wherein the laser beam comprises a swing laser beam which is irradiated while moving back and forth.

8. The laser cutting method of claim 1, wherein the object comprises a glass substrate having a polarization layer on a surface thereof.

9. A laser cutting method comprising:
preparing an object on a stage;
cutting the object into a set shape by relatively moving and irradiating a laser beam along the set shape with respect to the object; and
performing uniform heating compensation to reduce accumulation of thermal energy of the laser beam resulting from a change of speed at a shift point where a travelling direction of the laser beam with respect to the object changes,
wherein the set shape comprises a first section and a second section connected to each other with the shift point therebetween, and
the performing the uniform heating compensation comprises:
cutting up to the shift point by moving and irradiating the laser beam along the first section at a constant velocity with respect to the object;
overrun decelerating to allow the laser beam to overrun the set shape while maintaining, even after the shift point, the travelling direction and the constant velocity maintained when cutting the first section, and then decelerating the laser beam with respect to the object;
overrun direction shifting to change the direction at the outside of the set shape; and
overrun accelerating to accelerate the laser beam at the outside of the set shape such that the laser beam travels at the constant velocity with respect to the object, and then allowing the laser beam to enter the second section through the shift point.

10. The laser cutting method of claim 9, wherein the overrun decelerating, the overrun direction shifting, and the overrun accelerating comprise stopping the irradiating the laser beam.

11. The laser cutting method of claim 10, wherein the overrun decelerating comprises stopping the irradiating the laser beam at a moment when the laser beam moves beyond the first section, and the overrun accelerating comprises starting irradiating the laser beam at a moment when the laser beam enters the second section.

12. The laser cutting method of claim 9, wherein the first section and the second section comprise linear sections perpendicular to each other.

13. A laser cutting apparatus comprising:
a stage on which an object is to be placed;
a laser unit to cut the object into a set shape by relatively moving and irradiating a laser beam along the set shape with respect to the object and changing a speed of the laser beam with respect to the object about a shift point where a travelling direction of the laser beam with respect to the object changes; and
a controller to perform uniform heating compensation and reduce accumulation of thermal energy of the laser beam in response to the change of speed at the shift point.

14. The laser cutting apparatus of claim 13, wherein the set shape comprises a first section and a second section connected to each other with the shift point therebetween, and
the controller comprises:
a tracking unit to track a movement speed and a location of the laser beam relative to the object; and
an instruction unit to move and irradiate the laser beam along the first section at a constant velocity; allow the laser beam to overrun the set shape while maintaining, even after the shift point, the travelling direction and the constant velocity maintained when cutting the first section, and then decelerate the laser beam; change the travelling direction at the outside of the set shape so as to allow the laser beam to enter the second section; and then accelerate the laser beam at the outside of the set shape such that the laser beam travels at the constant velocity, and then allow the laser beam to enter the second section through the shift point.

15. The laser cutting apparatus of claim 13, wherein the controller comprises:
a tracking unit to track a movement speed and a location of the laser beam relative to the object; and
an instruction unit to increase, in response to the change of speed of the laser beam at the shift point, an interval between irradiation pulses of the laser beam and thus control a laser irradiation amount so as to be maintained the same per unit distance.

16. The laser cutting apparatus of claim 13, wherein the controller comprises:
a tracking unit to track a movement speed and a location of the laser beam relative to the object; and an instruction unit to decrease a beam intensity of the laser beam while changing a travelling speed of the laser beam at the shift point.

17. The laser cutting apparatus of claim 13, wherein the laser beam comprises a swing laser beam which is irradiated while moving back and forth.

18. The laser cutting apparatus of claim 13, wherein the object comprises a glass substrate having a polarization layer on a surface thereof.

* * * * *